United States Patent
Jacobson et al.

(10) Patent No.: US 8,019,947 B2
(45) Date of Patent: Sep. 13, 2011

(54) TECHNIQUE FOR THREAD COMMUNICATION AND SYNCHRONIZATION

(75) Inventors: Quinn A. Jacobson, Sunnyvale, CA (US); Hong Wang, Fremont, CA (US); John Shen, San Jose, CA (US); Per Hammarlund, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/254,286

(22) Filed: Oct. 19, 2005

(65) Prior Publication Data

US 2007/0088916 A1   Apr. 19, 2007

(51) Int. Cl.
  *G06F 12/00*   (2006.01)
(52) U.S. Cl. .................... 711/141; 711/E12.026
(58) Field of Classification Search .................... 711/141
See application file for complete search history.

(56) References Cited

U.S. PATENT DOCUMENTS

| | | | | |
|---|---|---|---|---|
| 5,202,998 | A * | 4/1993 | Yanes | 710/267 |
| 5,555,398 | A * | 9/1996 | Raman | 711/143 |
| 6,122,712 | A | 9/2000 | Torii | |
| 7,114,036 | B2 * | 9/2006 | DeWitt et al. | 711/141 |
| 7,287,126 | B2 * | 10/2007 | Desai | 711/145 |
| 7,624,236 | B2 * | 11/2009 | Chrysos et al. | 711/147 |
| 2003/0014602 | A1 | 1/2003 | Shibayama et al. | |
| 2003/0097529 | A1* | 5/2003 | Arimilli et al. | 711/141 |
| 2003/0126379 | A1 | 7/2003 | Kaushik et al. | |
| 2004/0162967 | A1 | 8/2004 | Tremblay et al. | |

FOREIGN PATENT DOCUMENTS

| | | |
|---|---|---|
| JP | 10-116192 | 5/1998 |
| JP | 2002-342163 | 11/2002 |
| JP | 2003-30049 | 1/2003 |
| WO | WO2007047959 A1 | 4/2007 |

OTHER PUBLICATIONS

International Preliminary Report on Patentability received for PCT Application No. PCT/US2006/041094, mailed on May 2, 2008, 9 pages.
International Search Report and Written Opinion received for PCT application No. PCT/US2006/041094, mailed on Mar. 9, 2007, 12 pages.
Office Action received for DE Patent Application No. 112006002908.8, mailed on Jul. 14, 2009, 8 pages inclusive of English Translation.
International Preliminary Report on Patentability; International Application No. PCT/US2006/041094; mailed Apr. 23, 2008; 8 pages.
Written Opinion of the International Searching Authority; Internatioanl Application No. PCT/US2006/041094; mailed Apr. 2005; 7 pages.
International Search Report; International Application No. PCT/US2006/041094; mailed Mar. 9, 2007; 2 pages.
Japanese Patent Office, Notice of Reasons for Rejection mailed Apr. 5, 2011 in Japanese application No. 2008-535803.

* cited by examiner

*Primary Examiner* — Reginald G Bragdon
*Assistant Examiner* — Hamdy S Ahmed
(74) *Attorney, Agent, or Firm* — Trop, Pruner & Hu, P.C.

(57) ABSTRACT

A technique for thread synchronization and communication. More particularly, embodiments of the invention pertain to managing communication and synchronization among two or more threads of instructions being executing by one or more microprocessors or microprocessor cores.

30 Claims, 4 Drawing Sheets

TECHNIQUE FOR THREAD COMMUNICATION AND SYNCHRONIZATION

FIELD

Embodiments of the invention relate to microprocessor architecture. More particularly, embodiments of the invention relate to managing communication and synchronization among two or more threads being executed within one or more microprocessors or microprocessor cores.

BACKGROUND

Instructions within modern computer programs may be organized for execution according to various instruction strings, or "threads". Typically, a thread of instructions executing within a processing resource uses and/or generates a set of state information unique to, or at least associated with, a particular thread. However, threads may also share state information or other information, such as data to be operated upon by one or more threads, in which case information may need to be passed from one thread to another.

In typical shared memory microprocessors or processing systems, threads exchange information by one thread (transmitting thread) storing the information in a memory location, which can be read by another thread (receiving thread). Typically, a receiving thread may poll the memory location at various times to detect when the transmitting thread has updated the data. In some prior art implementations, a detection mechanism may detect when the shared information is written and may alert the receiving thread in response thereto.

In the latter case, in which a detection mechanism detects when the shared information is written to a memory location and alerts the receiving thread, some prior art techniques use special hardware detection logic that monitors, or "snoops", the interconnect between microprocessors or between microprocessors and memory, such as DRAM. The detection logic may be configured to monitor for a command to a specific address to be transmitted across the interconnect, which may require detection logic for each memory location to be monitored.

Prior art techniques, such as those described above, can be costly in terms of die area and power. Furthermore, these prior art techniques, may not scale easily when monitoring updates to multiple memory locations, which can result in software development challenges.

There is prior art that covers mechanisms for reporting events directly to a user-level thread running on a microprocessor without requiring the traditional intervention of the operating system to notify of interrupts or exception cases. Such user-level interrupts or user-level exceptions are based on having a mechanism that saves sufficient information about the current state of the thread and redirects the thread to execute a pre-determined block of "handler" code to respond to the event. As part of the handler code the thread can perform any work it wishes to do and then return to the execution path it was on before the event. It may also choose to not return the execution path and instead continue to an entirely different set of tasks.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Figure 1:
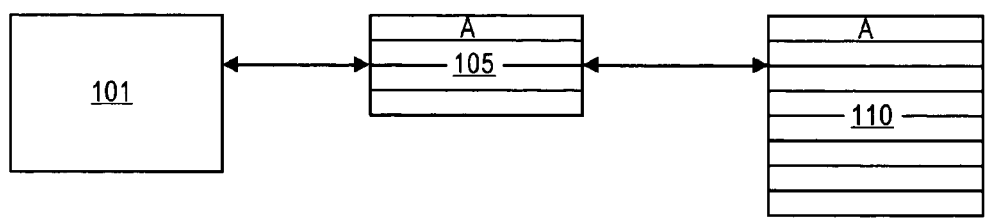
FIG. 1 illustrates a portion of a processing system that may be used in conjunction with at least one embodiment of the invention.

Embodiments of the invention pertain to microprocessor architecture. More particularly, embodiments of the invention pertain to managing communication and synchronization among two or more threads of instructions being executing by one or more microprocessors or microprocessor cores. At least one embodiment of the invention, provides a mechanism for a thread to identify a set of memory locations to be notified in the event that any other threads modify values stored in those memory locations. In one embodiment, notification may be performed by a user-level interrupt/exception mechanism within a microprocessor or implemented by some other logic or software within a computing system. In one embodiment, communication and synchronization among threads is accomplished by enabling threads to be notified of specific cache coherency events pertaining to lines of cache accessed by one or more other threads.

Unlike some prior art inter-thread communication techniques, embodiments of the invention may make use of many existing resources within a processor or computer system instead of using special detection hardware to monitor specific memory locations written to by a transmitting thread. Particularly, at least one embodiment uses coherency information that may already exist within a line of cache to detect when information is written to a cache line that corresponds to a location within memory, such as DRAM. More particularly, a line of cache that is currently in a state that permits local reading of the data values corresponding to the line (such as "shared" state) must have a coherency action performed to it prior to another thread modifying any data values corresponding to the line.

Unlike some prior art inter-thread communication techniques, embodiments of the invention may allow many unique updates to memory locations to be monitored by other threads. Particularly, at least one embodiment uses a common reporting mechanism to indicate whether one or more memory locations being monitored may have been updated by another thread.

One embodiment of the invention may detect a cache line state transition using a minimal amount of detection logic to merely detect a cache line state transition and notify a receiving thread making use of a user level interrupt mechanism, such that the receiving thread can retrieve the information written to the cache line. In other embodiments, detection of a cache line state transition may be programmed into a state channel of a processor as a monitoring event or "scenario". Still, in other embodiments, detection of a cache line state transition may occur in response to a hardware mechanism, such as interrupt, exception, trap, fault, etc.

In one embodiment, a cache line or cache lines may be enabled or "marked" as cache lines to be monitored by including one or more monitoring bits either within the cache line or otherwise associated with the cache line. In order to set the monitoring bits, at least one embodiment, may use a command or instruction or some other means. Furthermore, a number of monitoring bits may be used, such that certain parts of a user's code may configure the monitored cache line independently of other parts of the code. The monitoring bits may be cleared after the cache line state has been detected via clearing command or instruction or some other means.

FIG. 1 illustrates a portion of a processing system that may be used in conjunction with at least one embodiment of the invention. In particular, FIG. 1 illustrates a processor or processing core 101, which has associated therewith a cache memory 105, which may be shared by one or more threads of instructions executing within the processor/core 101 or some other processing resource (not shown). In one embodiment of the invention, the cache memory 105 appears to a thread as being exclusively used by that thread, such that a thread can store information within a cache line without regard to other threads that may be using the cache line.

Also illustrated in FIG. 1 is a memory, 110, which may consist of DRAM or some other memory technology, such as SRAM, magnetic or compact disk, etc. The cache memory 105 includes entries that are to mirror a subset of the entries of the memory 110, in one embodiment. Therefore, cache memory may include coherency information to inform agents accessing data from the cache memory when a particular cache line (e.g., cache line "A" in FIG. 1) contains invalid data ("I" state), or when the cache line has been modified ("M" state), such that it does not contain the same data as the corresponding memory entry (e.g., memory entry "A" in FIG. 1), when the cache line can be shared between various agents ("S" state), threads, or programs, and when the cache line is exclusively used by a particular thread, agent, or program ("E" state).

Figure 2:
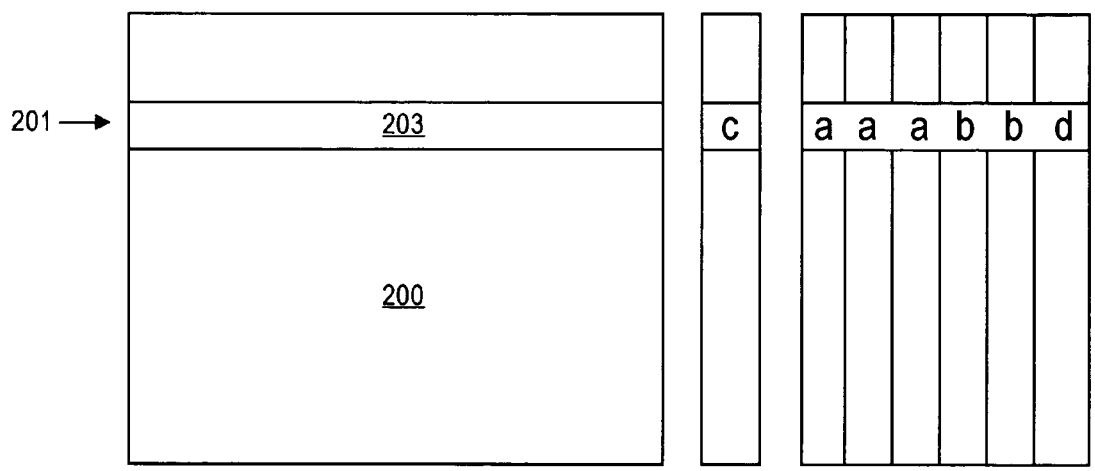
FIG. 2 illustrates a cache entry and corresponding coherency and monitoring entries that may be used according to one embodiment of the invention.

FIG. 2 illustrates a cache entry and corresponding coherency and monitoring entries that may be used according to one embodiment of the invention. Particularly, cache line 201 of cache 200 may store data corresponding to the cache line at field 203, the address tag and coherency information at field 205, and monitor information at field 207. In order to enable the monitoring of state changes to the cache line, one or more bits are set in the monitor information field. Furthermore, if a cache is shared by multiple hardware threads (each running independent software threads, for example) each thread may correspond to multiple bits within the monitor information field, depending upon how many instances within a thread may be monitoring the cache line.

For example, in FIG. 2 monitor bits labeled "a" correspond to a first thread having only three instances in the thread (which may be repeated) in which the corresponding cache line is monitored. Monitor bits labeled "b" correspond to a second thread having two instances (which may be repeated) in which the corresponding cache line is monitored. Monitor bit labeled "d" corresponds to a third thread having only one instance in the thread (which may be repeated) in which the corresponding cache line is monitored. Accordingly, each bit corresponding to each instances within each thread where the corresponding cache line is to be monitored, may be independently set or cleared.

The more monitor bit fields that are present in the cache line, of course, the more threads and instances within threads may monitor the cache line at once. In one embodiment, the cache line contains six monitor bit fields to allow two threads to monitor a cache line at three different instances within each thread. In other embodiments, more or fewer bit fields may be used to enable more or fewer threads or instances within threads that may monitor the cache line.

In one embodiment memory updates performed by one thread sharing a cache are treated, with respect to other threads sharing the same cache, are treated the same as coherency events from other threads not sharing the cache. For example, if a thread updates a value stored within the cache line, other threads having monitor bits set may detect this update and the corresponding threads notified by an interrupt mechanism, such as user-level interrupt mechanism. In other embodiments, the interrupt mechanism may be a user-invisible interrupt mechanism.

In one embodiment, two separate commands or instructions may be performed within a processor or logic within a cache memory to set and clear the monitor bits, respectively. For example, in one embodiment, a "load monitor" instruction may be performed having an address, which corresponds to a cache line, and the corresponding data to be written to the monitor bits as attributes. Similarly, in one embodiment, a "clear monitor" instruction may be performed having an address, which corresponds to a cache line, and the corresponding data to be written to clear the monitor bits as attributes. In one embodiment, one instruction is used to set and clear the monitor bits, depending upon the value of the monitor bit attributes of the instruction. In still another embodiment, one instruction is used to clear all of a specific attribute at every cache line.

Detection of a state transition of a cache line that has been flagged to be monitored (e.g., by setting the corresponding monitoring bits, in one embodiment) may be accomplished a number of ways. For example, in one embodiment, logic, such as one that performs a Boolean "OR" function (e.g., "OR" gate), may be used to detect whether a cache line has any of its corresponding monitor bits set, and if so, whether there has been a state transition in the coherency bits (labeled "c" in FIG. 1) of the cache line to indicate that a write by another thread has been performed to that cache line. In one embodiment, a state transition from any state that permits local reading of the corresponding data to an I state may indicate that a thread has written, or is about to write, information to a corresponding cache line. In addition a write to the cache line by another thread sharing the cache also can be detected as an update.

In other embodiments, the coherency state transition of a cache line may trigger an interrupt, exception, fault, trap, or other signaling mechanism within processing hardware to indicate that a thread has written information to the cache line. In other embodiments, other mechanisms may be used to indicate a coherency state transition that indicates a thread has written data to a particular cache line.

In one embodiment, in which events are being monitored on a per-thread basis, a logical combination of events known as a "scenario" may be defined to detect the transition of coherency state information for a cache line that may indicate data has been written to the cache line. In this case, a processor state storage area known as a "channel" may be programmed to perform substantially the same logical functions as the above mentioned hardware and/or software to detect a coherency state transition in a cache line. The occurrence of such a scenario may trigger a soft yield event, such as a fault-like or trap-like yield, which may invoke a yield event handler to deal with the scenario.

In one embodiment, the mechanism to notify a thread of an event that indicates a monitored line may have been, or may soon be, modified can have a mask with which may be programmed to an arbitrary set of the monitor bits. For example, in one embodiment the channel is programmed by performing a Boolean operation, such as a logical "AND" operation, between the channel mask and the programming bits to be written to the channel. In one embodiment this mechanism is a user-level interrupt mechanism, while in other embodiments the mechanism is a user-invisible interrupt mechanism. In one embodiment, the mechanism to notify a thread of an event that indicates a monitored line may have been, or may soon be, modified can also notify the software thread in response to other events such as a software thread being context switched into the hardware.

Regardless of how a possible updates of a monitored line is detected, indicating a thread has been written, or potentially will be written, to a particular cache line, the detection of such a state transition may cause a handler to be invoked to deal with the detection. One possible task the handler can perform is to read an addressed being monitored, or to a set of addresses being monitored, to see if another thread has updated the memory location with a value of interest; and if a memory location has been updated to a value of interest it can perform an appropriate action such as invoking a particular software function.

Figure 3:
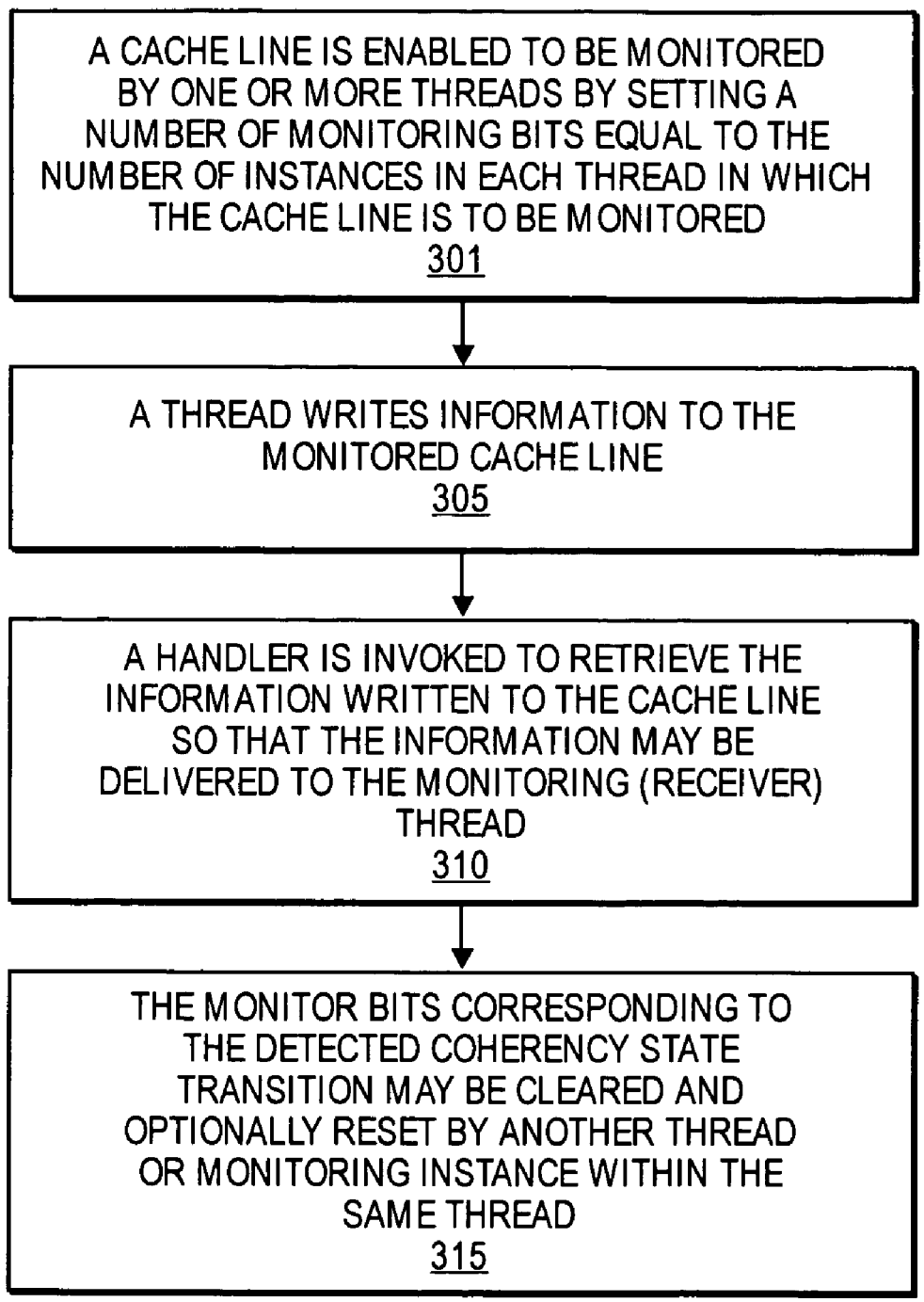
FIG. 3 is a flow diagram illustrating operations involved in detecting a coherency state transition that may indicate a write has occurred by a thread to a cache line according to one embodiment.

FIG. 3 is a flow diagram illustrating operations involved in detecting a coherency state transition that may indicate a write has occurred by a thread to a cache line according to one embodiment. At operation 301, a cache line is enabled to be monitored by one or more threads by setting a number of monitoring bits equal to the number instances in each thread in which the cache line is to be monitored. In one embodiment, the cache line is enabled by performing an instruction (e.g., "load monitor" instruction) whose attributes correspond to the monitor bits to be set. At operation 305, a thread writes information to the monitored cache line, causing a coherency state transition, then at operation 310, a handler is invoked to retrieve the information written to the cache line so that the information may be delivered to the monitoring (receiver) thread.

In one embodiment, the coherency state transition may be detected using logic that detects whether the monitor bits are set and, if so, whether a coherency state transition has occurred. In other embodiments, the coherency state transition may be detected by software, hardware, or some combination thereof. Furthermore, in at least one embodiment, the coherency state transition is detected by programming a scenario into a processor state channel and reported to the receiving thread by a user-level interrupt mechanism.

At operation 315, the monitor bits corresponding to the detected coherency state transition may be cleared and optionally reset by another thread or monitoring instance within the same thread. In one embodiment, the monitor bits may be cleared by performing a different instruction (e.g., "clear monitor" instruction) than the instruction that set the monitor bits, having attributes that correspond to the cleared monitor bits. In other embodiments, the same instruction (e.g., "load monitor" instruction) may be used to clear the monitor bits that was used to set the monitor bits by using attributes that correspond to the cleared monitor bits.

In one embodiment, an interface is provided to a user's software program where software can specify variables to monitor and actions to take in response thereto. In one embodiment, a user's software program may provide a specific memory variable, a specific comparison rule for evaluating the value of the specified memory variable, and function pointer with optional arguments to invoke if the value of the memory variable satisfies the evaluation criteria. In such an embodiment the software can specify this information either through a means, such as an instruction or through a set of multiple instructions.

Additionally, user software can specify multiple variables to monitor, each corresponding to a unique or common responsive action. While the variable(s) is/are being monitored, a thread can continue to perform other functions. When a function is invoked in response to the occurrence of the monitored variable, the function may return control to the thread such that the thread may continue to execute, thereby providing a scalable and flexible interface.

In one embodiment, an interface, such as that described above, includes information describing each variable, the comparison rule for that variable and the action or function to be invoked and its arguments. In one embodiment this information is stored in a table within a storage area, such as a main computer system memory (e.g., DRAM). Software, firmware or hardware may, at appropriate times, read this table and for each entry read the specified variable and perform the comparison rule to determine if the action should be invoked.

Furthermore, the mechanism described earlier to mark lines in the cache to be monitored can be used to mark each line corresponding to a variable to be monitored. If an event is detected in a monitored line that indicates that the line may now be modified by another thread the appropriate software, firmware or hardware can be activated as described above to evaluate all the monitored variables in the table. If no variables meet their criteria the software, firmware or hardware will ensure that all appropriate lines are still being monitored and return to the work being performed prior to its invocation.

The software, firmware or hardware that evaluates the table of variables and invokes the appropriate function can manipulate the threads memory stack so that when it invokes a function in response to a variable meeting its criteria that function can return directly to the previous running task. Alternatively the software, firmware or hardware can manipulate the stack so that a function will return to a special piece of code to ensure that all cache lines corresponding to variables are being appropriately monitored before ultimately returning to the previous running task. Yet another alternative is to have a special return instruction that functions invoked in response to variable meeting its criteria will use. This special return instruction will ensure that all cache lines corresponding to variables are being appropriately monitored before ultimately returning to the previous running task.

Figure 4:
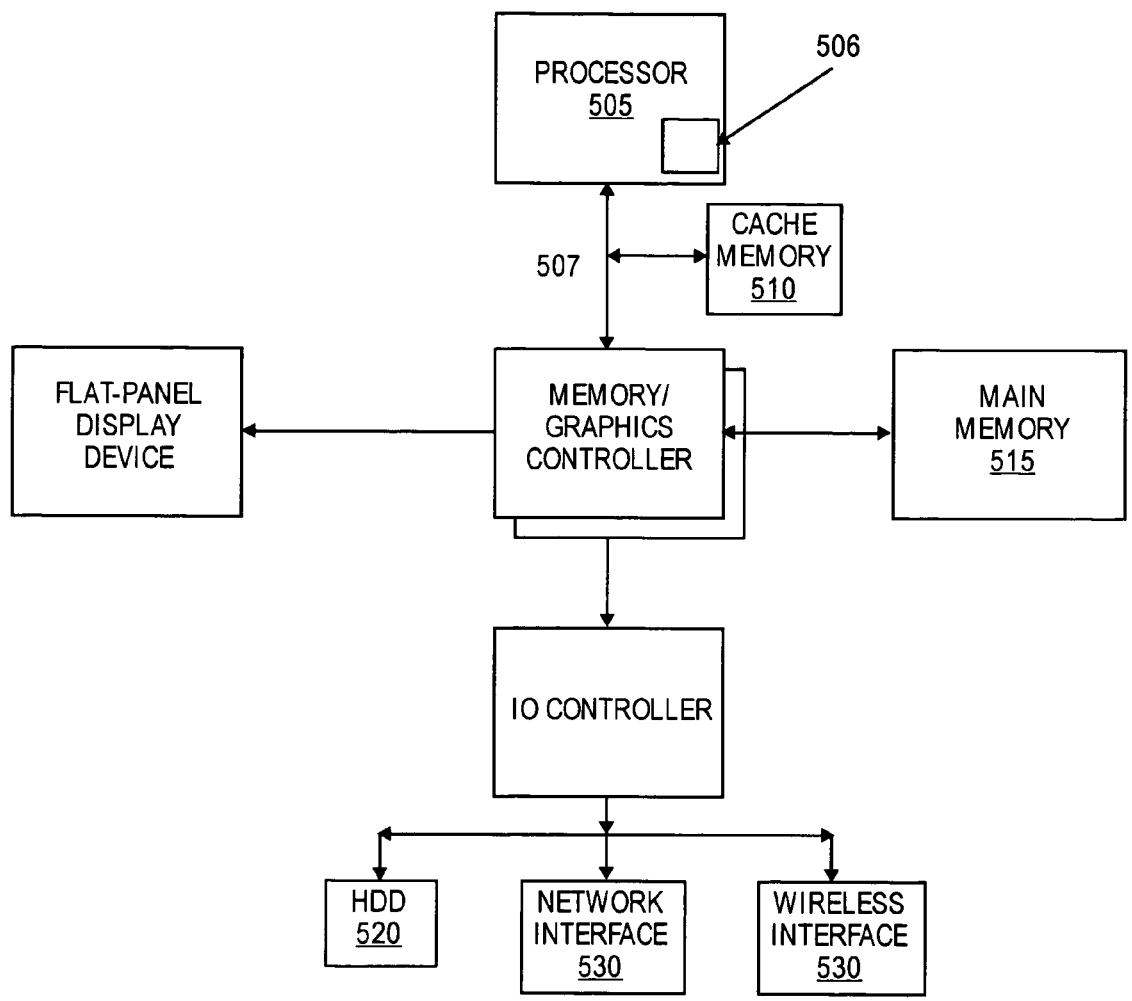
FIG. 4 illustrates a front-side-bus (FSB) computer system in which one embodiment of the invention may be used.

FIG. 4 illustrates a front-side-bus (FSB) computer system in which one embodiment of the invention may be used. A processor 505 accesses data from a level one (L1) cache memory 510 and main memory 515. In other embodiments of the invention, the cache memory may be a level two (L2) cache or other memory within a computer system memory hierarchy. Furthermore, in some embodiments, the computer system of FIG. 4 may contain both a L1 cache and an L2 cache.

Illustrated within the processor of FIG. 4 is a storage area 506 for machine state. In one embodiment storage area may be a set of registers, whereas in other embodiments the storage area may be other memory structures. Also illustrated in FIG. 4 is a storage area 507 for save area segments, according to one embodiment. In other embodiments, the save area segments may be in other devices or memory structures. The processor may have any number of processing cores. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 520, or a memory source located remotely from the computer system via network interface 530 containing various storage devices and technologies. The cache memory may be located either within the processor or in close proximity to the processor, such as on the processor's local bus 507.

Figure 5:
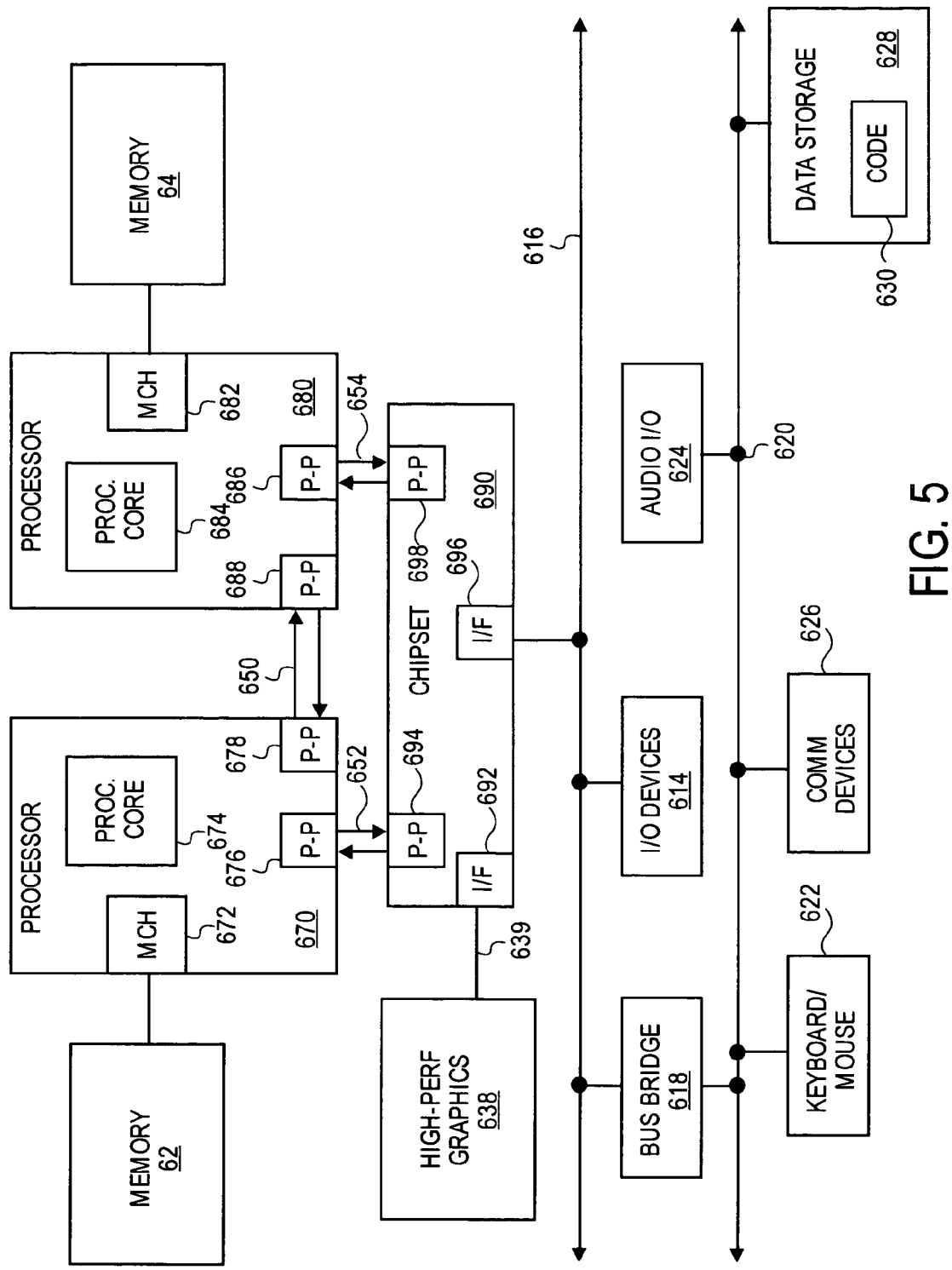
FIG. 5 illustrates a computer system that is arranged in a point-to-point (PtP) configuration.

Furthermore, the cache memory may contain relatively fast memory cells, such as a six-transistor (6T) cell, or other memory cell of approximately equal or faster access speed. The computer system of FIG. 4 may be a point-to-point (PtP) network of bus agents, such as microprocessors, that communicate via bus signals dedicated to each agent on the PtP network. FIG. 5 illustrates a computer system that is arranged in a point-to-point (PtP) configuration. In particular, FIG. 5 shows a system where processors, memory, and input/output devices are interconnected by a number of point-to-point interfaces.

The system of FIG. 5 may also include several processors, of which only two, processors 670, 680 are shown for clarity. Processors 670, 680 may each include a local memory controller hub (MCH) 672, 682 to connect with memory 22, 24. Processors 670, 680 may exchange data via a point-to-point (PtP) interface 650 using PtP interface circuits 678, 688. Processors 670, 680 may each exchange data with a chipset 690 via individual PtP interfaces 652, 654 using point to point interface circuits 676, 694, 686, 698. Chipset 690 may also exchange data with a high-performance graphics circuit 638 via a high-performance graphics interface 639. Embodiments of the invention may be located within any processor having any number of processing cores, or within each of the PtP bus agents of FIG. 5.

Other embodiments of the invention, however, may exist in other circuits, logic units, or devices within the system of FIG. 5. Furthermore, in other embodiments of the invention may be distributed throughout several circuits, logic units, or devices illustrated in FIG. 5.

Various aspects of embodiments of the invention may be implemented using complimentary metal-oxide-semiconductor (CMOS) circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. An apparatus comprising:
a cache memory including one or more monitor bit fields to indicate whether a corresponding cache line is to be monitored for an event that may enable a thread to modify data corresponding to the cache line;
detection logic to detect whether data has been written to the cache line if a monitor bit in the one or more bit fields is set, wherein the one or more monitor bit fields are to be set by a first instruction and wherein a store operation or potential store operation, by a first thread to the cache line, is to cause invocation of a handler to determine whether a second thread has updated the cache line and wherein the handler is to cause retrieval of information written to the cache line by the second thread so that the information may be delivered to a monitoring thread.

2. The apparatus of claim 1 further comprising a memory to store a plurality of instructions, including a second instruction to clear the monitor bit, and a third instruction to enable the detection logic.

3. The apparatus of claim 2 wherein the first instruction and the second instruction are the same instruction.

4. The apparatus of claim 1 wherein the event is to cause a notification by an interrupt mechanism or a user-level interrupt mechanism.

5. The apparatus of claim 4 where the user-level interrupt mechanism is to cause an instruction to be performed indicated by the thread.

6. The apparatus of claim 1 wherein the cache memory includes a coherency state field to store coherency information related to the cache line.

7. The apparatus of claim 6 wherein the detection logic is to detect a transition in the coherency state field that indicates that the data is to be written to the cache line.

8. The apparatus of claim 7 wherein the transition in the coherency state field includes a transition from a shared state to an invalid state.

9. A system comprising:
a cache memory including a plurality of monitor bit fields to indicate whether a corresponding cache line is to be monitored for an event that may enable a thread to modify data corresponding to the cache line by a transmitting thread;
a first memory to store a first instruction to set bits within the plurality of monitor bit fields and a third instruction to enable detection logic to detect whether data has been written to the cache line by the transmitting thread, wherein a store operation or potential store operation, by a first thread to the cache line, is to cause invocation of a handler to determine whether a second thread has updated the cache line and wherein the handler is to cause retrieval of information written to the cache line by the second thread so that the information may be delivered to a monitoring thread.

10. The system of claim 9 further comprising a processor to execute a receiver thread to read the data from the cache line if the detection logic detects that data has been written to the cache line and a monitor bit corresponding to the receiver thread has been set within the plurality of monitor bit fields.

11. The system of claim 10 wherein the first memory includes a second instruction to clear at least some of the plurality of monitor bit fields.

12. The system of claim 10 wherein the first memory is to store a plurality of instructions to enable detection logic to detect whether data has been written to the cache line by the transmitting thread, wherein each of the plurality of instructions and the third instruction has an associated priority level.

13. The system of claim 12 wherein the detection logic includes a state channel to be programmed with information to detect a scenario.

14. The system of claim 9 wherein the cache memory includes a coherency state field to store coherency information related to the cache line.

15. The system of claim 14 wherein the detection logic is to detect a transition in the coherency state field that indicates that the data has been written to the cache line.

16. The apparatus of claim 9 wherein the detection logic includes a logic to detect, in response to data written to the cache line, one of a group consisting of: an exception, a fault, a trap, an interrupt.

17. A method comprising:
enabling a cache line to be monitored for data written to the cache line by an instruction within a transmitting thread;

enabling detection of the data written to the cache line;

detecting an event that may enable another thread to modify data corresponding to the cache line;

invoking a handler in response to detecting the data written to the cache line wherein the handler is to determine whether another thread has updated the cache line and wherein the handler is to cause retrieval of information written to the cache line by the other thread so that the information may be delivered to a monitoring thread;

delivering the data to a receiving thread.

18. The method of claim 17 wherein enabling the cache line to be monitored includes performing an instruction to set at least one monitoring bit within a monitoring bit field corresponding to the cache line.

19. The method of claim 18 wherein enabling detection of data written to the cache line includes performing an instruction to program state channel logic to detect a scenario corresponding to the cache line to be monitored.

20. The method of claim 19 wherein enabling detection of data written to the cache line includes enabling detection logic to detect a signal asserted in response to the data being written to the cache line chosen from a group consisting of: an exception, a fault, a trap, an interrupt.

21. The method of claim 19 wherein detecting includes detecting a coherency state transition of the cache line from a first state to a second state.

22. The method of claim 21 wherein the first state is shared state and the second state is an invalid state.

23. The method of claim 19 wherein the scenario includes detecting whether the cache line is to be monitored and if so, whether a coherency state transition has occurred for the cache line from a first state to an invalid state.

24. The method of claim 23 wherein the instruction to program the state channel logic is one of a plurality of instructions to program the state channel logic, each of which corresponding to a different instance within one or more threads at which the cache line is to be monitored.

25. The method of claim 24 wherein each of the plurality of instructions has a unique priority to control the order in which the plurality of instructions are to be performed.

26. A non-transitory machine-readable medium having stored thereon a set of instructions,
which if executed by a machine cause the machine to perform a method comprising:
storing information to describe a variable corresponding to a cache line to be monitored;
using a comparison rule to determine whether the variable has been set to a first value;
specifying a pointer to at least one instruction to be performed if the comparison rule is satisfied, wherein the at least one instruction enables information to be shared among two or more threads in response to the comparison rule being satisfied, wherein a store operation or potential store operation, by a first thread to the cache line, is to cause invocation of a handler to determine whether a second thread has updated the cache line and wherein the handler is to cause retrieval of information written to the cache line by the second thread so that the information may be delivered to a monitoring thread.

27. The machine-readable medium of claim 26 wherein at least one argument is to be optionally passed to the at least one instruction in response to the comparison rule being satisfied.

28. The machine-readable medium of claim 27 further comprising clearing the variable after the comparison rule is satisfied.

29. The machine-readable medium of claim 28 wherein the two or more threads are to continue performing regardless of whether the comparison rule is satisfied.

30. The machine-readable medium of claim 29 wherein the comparison rule uses processor logic to determine whether the variable has been set to the first value.

* * * * *